US006532844B2

(12) United States Patent
Rohs

(10) Patent No.: US 6,532,844 B2
(45) Date of Patent: Mar. 18, 2003

(54) CRANKSHAFT OF A MOTOR

(75) Inventor: Ulrich Rohs, Düren (DE)

(73) Assignee: Gif Gesselleschaft for Indusrie Forschung mbH, Aachen (DE)

( * ) Notice: Subject to any disclaimer, the term of this patent is extended or adjusted under 35 U.S.C. 154(b) by 0 days.

(21) Appl. No.: 10/196,073

(22) Filed: Jul. 16, 2002

(65) Prior Publication Data

US 2002/0178860 A1 Dec. 5, 2002

Related U.S. Application Data

(62) Division of application No. 09/538,539, filed on Mar. 30, 2000, now Pat. No. 6,439,080.

(30) Foreign Application Priority Data

Apr. 7, 1999 (DE) ........................................ 199 15 508

(51) Int. Cl.[7] .................................................. F16C 3/04
(52) U.S. Cl. ............................ 74/595; 74/572; 403/369
(58) Field of Search ........................... 74/595–604, 572; 403/369, 370, 374.3

(56) References Cited

U.S. PATENT DOCUMENTS

| | | | | | |
|---|---|---|---|---|---|
| 2,190,411 | A | * | 2/1940 | Mattison | 74/597 |
| 2,755,093 | A | * | 7/1956 | Peter et al. | 74/597 |
| 4,105,343 | A | * | 8/1978 | Riegler et al. | 403/15 |
| 4,277,972 | A | * | 7/1981 | Wolschlager | 73/862.16 |
| 4,373,480 | A | * | 2/1983 | Shikata et al. | 403/370 |
| 4,615,640 | A | * | 10/1986 | Hosokawa | 403/369 |
| 5,667,333 | A | * | 9/1997 | Phillips | 403/369 |
| 5,699,890 | A | * | 12/1997 | Swenson, Sr. | 192/110 R |
| 5,951,198 | A | * | 9/1999 | Phillips | 403/369 |

FOREIGN PATENT DOCUMENTS

| | | |
|---|---|---|
| DE | 27 03 795 A | 8/1977 |
| GB | 2 013 835 A | 8/1979 |

* cited by examiner

*Primary Examiner*—Chong H. Kim
(74) *Attorney, Agent, or Firm*—Yongzhi Yang; Marianne Fuierer; Steven J. Hultquist

(57) ABSTRACT

For a crankshaft of a motor with two outputs, which are braced against each other on a common shaft section by means of an essentially axial directed bracing force, measures are suggested, which deflect the axially directed bracing force into a bracing force with a radial component, that acts on at least one output.

9 Claims, 2 Drawing Sheets

CRANKSHAFT OF A MOTOR

CROSS-REFERENCE TO RELATED APPLICATION

This is a divisional application of U.S. patent application Ser. No. 09/538,539, filed on Mar. 30, 2000 now U.S. Pat. No. 6,439,080 under the provisions of 35 U.S.C. §119 and claiming priority to German Patent Application No. 199 15 508.9, filed on Apr. 7, 1999.

FIELD OF THE INVENTION

The invention relates to the crankshaft of a motor with at least two outputs, which are braced against each other on a common section of the shaft by means of an axially directed bracing force. In this respect, the invention relates in particular to crankshafts with a belt pulley and a chain wheel as outputs, as they are used, for example, for the operation of oil pumps, camshafts, generators and suchlike uses in motor vehicles.

BACKGROUND OF THE INVENTION

With configurations described hereinabove, in particular with chain wheels driving a camshaft or similar, the relative position of the outputs on the crankshaft is crucial. On one hand this position must be determined appropriately, so that the movement of the camshaft runs adequately in phase with the movement of the rest of the motor. In particular, these settings must not change during the operation of the motor, even under the highest loading. Therefore up until now outputs such as this have been connected positively to the crankshaft.

On the other hand, there should also be the possibility of adjustments, in particular to correct the play and inaccuracies of assembly. With a positive connection between the shaft and the outputs this is only possible with major effort.

To simplify the assembly, bracing a chain wheel as well as a belt pulley against a shoulder of the shaft with a tensioning nut is already known (see FIG. 3). While a bracing of this type is sufficient to fix the outputs on the crankshaft during normal operation of the motor, torque peaks can cause the outputs to be shifted in the direction of the circumference against the crankshaft. As a result, the crankshaft and the output become out of phase, which can lead to destruction of the particular motor.

The object of the present invention is to provide a generic configuration, which maintains the assembly advantages and which at the same time ensures an adequate fixation of the output on the crankshaft.

SUMMARY OF THE INVENTION

One aspect of the invention proposes a crankshaft of a motor with at least two outputs, which are braced against one another on a common shaft section by means of an essentially axial bracing force. The crankshaft comprises a first output, a second output, and a deflection means that deflects the axially directed bracing force into a radially directed bracing force, which acts on at least one of the outputs, wherein the deflection means comprises a bracing ring comprising a first cone-shaped portion arranged between the shaft and a corresponding recess in the first output and a second cone-shaped portion integral to the first cone-shaped portion and arranged between the shaft and a corresponding recess in the second output.

Another aspect of the present invention relates to a crankshaft for a motor with at least two outputs, which are braced against one another on a common shaft section by means of an essentially axial bracing force. The crankshaft comprises a first output, a second output, and a bracing element. The bracing element is arranged between the shaft and said two outputs and comprises a first cone-shaped portion arranged to fit into a corresponding recess of the first output and a second cone-shaped portion arranged to fit into a corresponding recess of the second output.

DETAILED DESCRIPTION OF THE INVENTION AND PREFERRED EMBODIMENTS THEREOF

By using the deflection means or bracing element, the essentially axial bracing force is deflected into radial forces that act on the output as well as the shaft, which results in a substantially higher bracing between those two modules. Through this, substantially higher torque can be applied, so that this configuration sufficiently attaches the two assemblies, even when torque peaks occur.

It is particularly advantageous if the bracing force acts with its radial component on one of the outputs as well as on the crankshaft itself. Through this its fixation in direction of the circumference is further increased.

Advantageously, the bracing element or deflection means are arranged between the two outputs, so that the desired effect can be reached with only one additional module. This enables a relatively inexpensive realization of the invention.

Furthermore, the deflection means or bracing element can be connected to one of the outputs as one piece where its cone-shaped portion is fitted into a corresponding recess of the other output. Through this, an additional separate module can be omitted. The deflection means or bracing element are simply designed accordingly at the corresponding output. This contributes to a further cost reduction during production on one hand and during assembly on the other.

Furthermore, one of the outputs can contact a shaft shoulder with the side facing away from the deflection means or bracing element. This ensures an exact axial positioning of this output with respect to the crankshaft. The latter configuration is suitable in particular for chain wheels, which should be exactly positioned axially, to ensure smooth chain running. A belt pulley located next to the chain wheel, however, can slide onto the cone-shaped portion of a bracing element, because a belt pulley does not necessarily require a precise axial position. It goes without saying, that the use of such a shaft shoulder is not restricted to the assemblies described or the configuration described above. Furthermore, said shaft shoulder can be used in many kinds of outputs.

Further advantages, objectives and characteristics of the present invention are explained with the help of the enclosed drawings accompanied by the following description, in which examples of two crankshafts according to the invention are illustrated.

Figure 1:
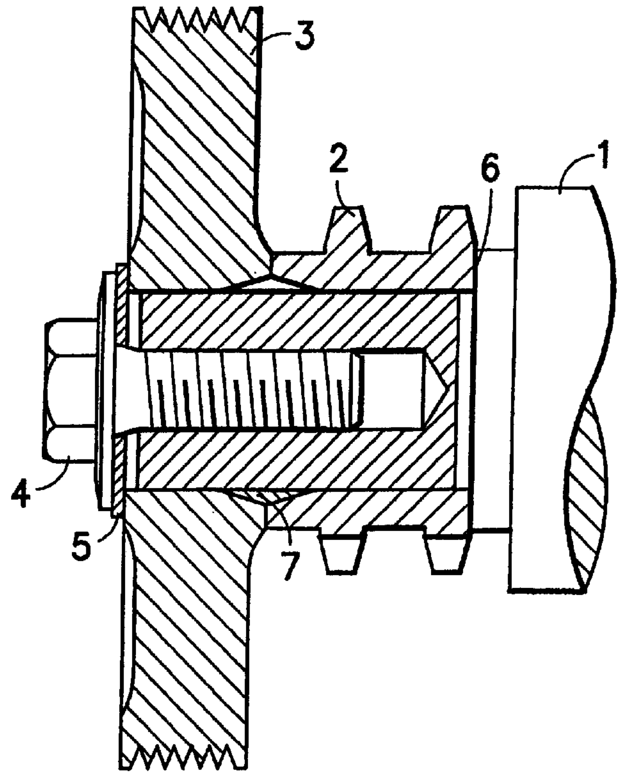
FIG. 1 shows a crankshaft according to one embodiment of the present invention in cross-section.
Figure 2:
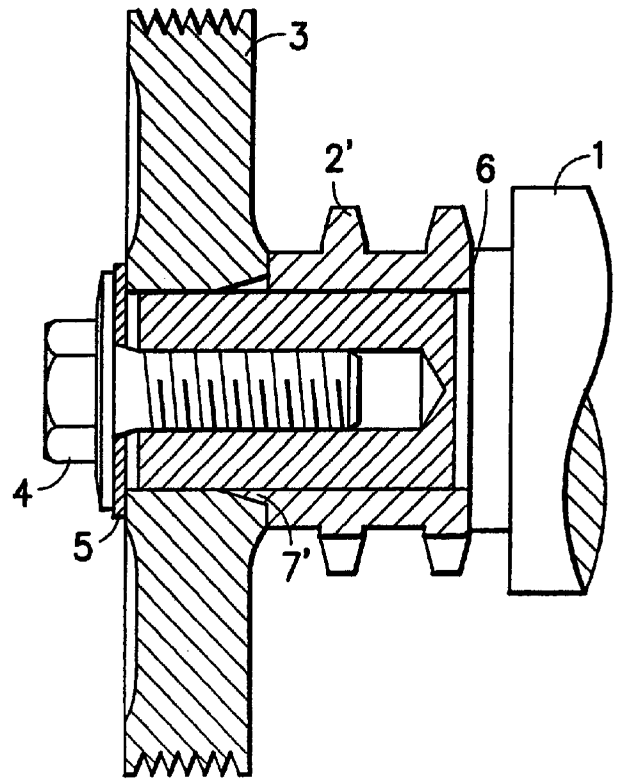
FIG. 2 shows a crankshaft according to another embodiment of the present invention in cross-section.
Figure 3:
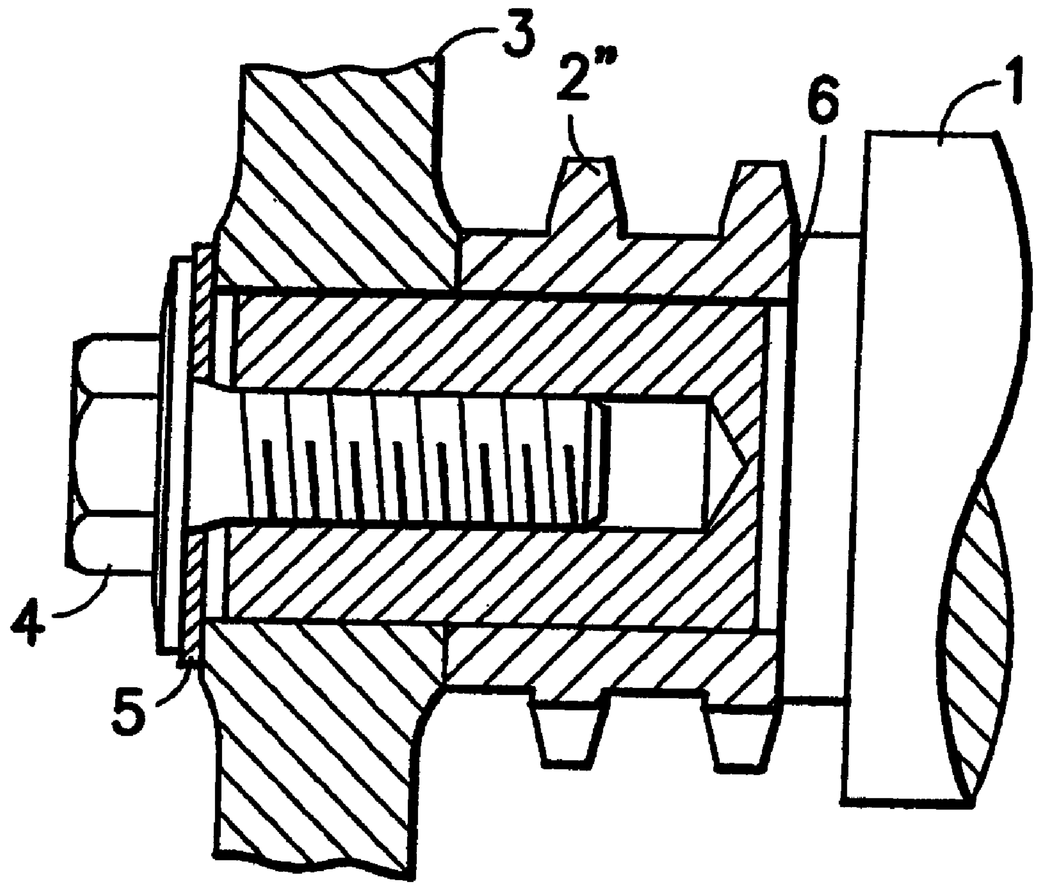
FIG.3 (Prior Art)
FIG. 3 shows a crankshaft according to the state of the art in cross-section.

With the crankshafts illustrated in FIGS. 1–3, two outputs, namely the chain wheels 2, 2', 2" and belt pulleys 3, 3', are braced on a journal of a crankshaft 1 with a bracing screw 4 and a washer 5 against a shaft shoulder 6.

In the embodiment illustrated in FIG. 1, a bracing ring 7 is located between the chain wheel 2 and the belt pulley 3 as a bracing element. Said bracing ring has two cone-shaped portions, which are fitted into the corresponding recesses of the chain wheel 2 and the belt pulley 3.

To simplify an application of the radial bracing forces in the present embodiments, the bracing ring is to be provided with means, which permit radial movement of the cone-shaped portions.

In the embodiment illustrated in FIG. 1 this is achieved through the bracing ring 7 being designed with slots. If the bracing screw 4 is tightened in this configuration, both the chain wheel 2 and the belt pulley 3 move onto the bracing ring 7 which is being compressed. Consequently, bracing forces with a radial component are produced.

In the embodiment illustrated in FIG. 2 bracing lips 7' with cone-shaped portions are provided on the chain wheel 2', which fit into the corresponding recess of the belt pulley 3. As the bracing lips 7' are separated, they can be moved slightly radially onto the shaft 1. Consequently a radial bracing is created.

In these embodiments the bracing is performed with regard to the crankshaft 1 as well as to the outputs 2, 2', 3, whereby a particularly good fixation is ensured.

In the embodiments according to the invention illustrated in the FIGS. 1 and 2, the angles of the bracing elements 7, 7' and the corresponding recesses are preferably between 15° and 30°.

With these configurations torque of up to 2000 Nm can be transferred, while with a comparable configuration according to the state of the art (see FIG. 3), where the bracing screw 4 is tightened in the same way but only axial forces occur, the torque transfer is restricted to 400 Nm.

What is claimed is:

1. A crankshaft for a motor with at least two outputs, which are braced against one another on a common shaft section by means of an essentially axial bracing force, the crankshaft comprising:

a first output;

a second output; and a deflection means that deflects the axially directed bracing force into a radially directed bracing force that acts on at least one of the outputs, wherein the deflection means comprises a bracing ring comprising a first cone-shaped portion arranged between the shaft and a corresponding recess in the first output, and a second cone-shaped portion integral to the first cone-shaped portion and arranged between the shaft and a corresponding recess in the second output.

2. The crankshaft according to claim 1, wherein the first output is a chain wheel that contacts a shaft shoulder with a side facing away from the deflection means.

3. The crankshaft according to claim 1, wherein one of the first output and the second output comprises a chain wheel.

4. The crankshaft according to claim 1, wherein one of the first output and the second output comprises a belt pulley.

5. A crankshaft for a motor with at least two outputs, which are braced against one another on a common shaft section by means of an essentially axial bracing force, the crankshaft comprising:

a first output;

a second output; and a bracing element arranged between the shaft and said two outputs, wherein said bracing element comprises a first cone-shaped portion arranged to fit into a corresponding recess of the first output, and a second cone-shaped portion arranged to fit into a corresponding recess of the second output.

6. The crankshaft according to claim 5, wherein the second output contacts a shaft shoulder with a side facing away from the bracing element.

7. The crankshaft according to claim 5, wherein one of the first output and the second output comprises a chain wheel.

8. The crankshaft according to claim 5, wherein one of the first output and the second output comprises a belt pulley.

9. The crankshaft according to claim 5, wherein the bracing element comprises a bracing ring comprising two cone-shaped portions opposite from each other for fitting into recesses of the first and second outputs.

* * * * *